(12) United States Patent
Rezaei et al.

(10) Patent No.: US 10,061,523 B2
(45) Date of Patent: Aug. 28, 2018

(54) VERSIONING STORAGE DEVICES AND METHODS

(71) Applicants: Arash Rezaei, Raleigh, NC (US); Tameesh Suri, San Jose, CA (US); Bob Brennan, Santa Clara, CA (US)

(72) Inventors: Arash Rezaei, Raleigh, NC (US); Tameesh Suri, San Jose, CA (US); Bob Brennan, Santa Clara, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 109 days.

(21) Appl. No.: 15/086,020

(22) Filed: Mar. 30, 2016

(65) Prior Publication Data
US 2017/0206024 A1 Jul. 20, 2017

Related U.S. Application Data

(60) Provisional application No. 62/279,655, filed on Jan. 15, 2016.

(51) Int. Cl.
*G06F 3/06* (2006.01)

(52) U.S. Cl.
CPC ............ *G06F 3/0614* (2013.01); *G06F 3/064* (2013.01); *G06F 3/0608* (2013.01); *G06F 3/0659* (2013.01); *G06F 3/0679* (2013.01); *G06F 2212/1036* (2013.01); *G06F 2212/7201* (2013.01); *G06F 2212/7211* (2013.01)

(58) Field of Classification Search
CPC .................. G06F 3/0608; G06F 3/064; G06F 2212/7201; G06F 2212/7203; G06F 2212/1036; G06F 2212/7202; G06F 2212/7207; G06F 2212/2022; G06F 2212/214; G06F 2212/7205; G06F 3/0641
See application file for complete search history.

(56) References Cited

U.S. PATENT DOCUMENTS

| | | | |
|---|---|---|---|
| 8,688,900 B2 | 4/2014 | Eleftheriou et al. | |
| 2010/0241790 A1* | 9/2010 | Whang | G06F 12/0246 711/103 |
| 2013/0318196 A1 | 11/2013 | Yamamoto et al. | |

(Continued)

OTHER PUBLICATIONS

Cooper, Brian F., "Benchmarking Cloud Serving Systems with YCSB," SoCC'10, Jun. 10-11, 2010, 12 pages.

(Continued)

*Primary Examiner* — Reginald Glenwood Bragdon
*Assistant Examiner* — Thanh Duc Vo
(74) *Attorney, Agent, or Firm* — Renaissance IP Law Group LLP

(57) ABSTRACT

An embodiment includes a storage device, comprising: a memory; and a controller including a memory interface coupled to the memory, the controller configured to: receive write data to write to an address associated with first data stored in the memory and a first differentially compressed value stored in the memory; calculate a second differentially compressed value based on the write data and the first data; store the second differentially compressed value in the memory; and change the association of the address to reference the second differentially compressed value instead of the first differentially compressed value.

20 Claims, 12 Drawing Sheets

(56) References Cited

U.S. PATENT DOCUMENTS

2014/0059279 A1* 2/2014 He .................. G06F 12/0246
  711/103
2015/0199138 A1 7/2015 Ramachandran et al.

OTHER PUBLICATIONS

Dean, Jeffrey et al., "The Tail at Scale," Software techniques that tolerate latency variability are vital to building responsive large-scale Web services, Communications of the ACM, Feb. 2013, vol. 56, No. 2, pp. 74-80.

Lee, Sang-Won et al., "Transactional In-Page Logging for Multiversion Read Consistency and Recovery," ICDE Conference 2011, 2011 IEEE, pp. 876-887.

Luo, Xixin et al, "WARM: Improving NAND Flash Memory Lifetime with Write-hotness Aware Retention Management," 2015 31st Symposium on Mass Storage Systems and Technologies (MSST), IEEE 2015, May 30-Jun. 5, 2015, 14 pages.

* cited by examiner

VERSIONING STORAGE DEVICES AND METHODS

CROSS-REFERENCE TO RELATED APPLICATIONS

This application claims the benefit of U.S. Provisional Patent Application No. 62/279,655, filed Jan. 15, 2016, the contents of which is hereby incorporated by reference herein, in its entirety, for all purposes.

BACKGROUND

This disclosure relates to storage devices and, in particular, versioning storage devices and methods.

Storage devices may operate in ways that impact latency. For example, data is written to solid state storage devices/drives (SSD) in page units. A block is created from multiple pages. The flash memory can only be erased in block units. If some of the pages in a block are no longer needed, other valid pages in the block are read and written to another block to free up the stale block. The stale block may then be erased. This process is called garbage collection.

Garbage collection may increase the latency of the storage device. In particular, the SSD may not be able to process read and/or write requests while performing garbage collection. As a result, incoming read/write requests may be delayed until the garbage collection has finished.

Some hard disk drives use shingled magnetic recording. With shingled magnetic recording, tracks on the storage medium overlap. When data stored in a track is modified and that track is rewritten, overlapping tracks must also be read and rewritten. These additional operations increase latency while they are performed.

SUMMARY

An embodiment includes a storage device, comprising: a memory; and a controller including a memory interface coupled to the memory, the controller configured to: receive write data to write to an address associated with first data stored in the memory and a first differentially compressed value stored in the memory; calculate a second differentially compressed value based on the write data and the first data; store the second differentially compressed value in the memory; and change the association of the address to reference the second differentially compressed value instead of the first differentially compressed value An embodiment includes a method, comprising: receiving write data to write to an address associated with first data stored in a memory and a first differentially compressed value stored in the memory; calculating a second differentially compressed value based on the write data and the first data; storing the second differentially compressed value in the memory; and changing the association of the address to reference the second differentially compressed value instead of the first differentially compressed value.

An embodiment includes a system, comprising: a communication interface; and a processor coupled to a memory through the communication interface, the processor configured to: receive write data to write to an address associated with first data stored in a storage device coupled to the processor and a first differentially compressed value; calculate a second differentially compressed value based on the write data and the first data; and change the association of the address to reference the second differentially compressed value instead of the first differentially compressed value.

DETAILED DESCRIPTION

Figure 1:
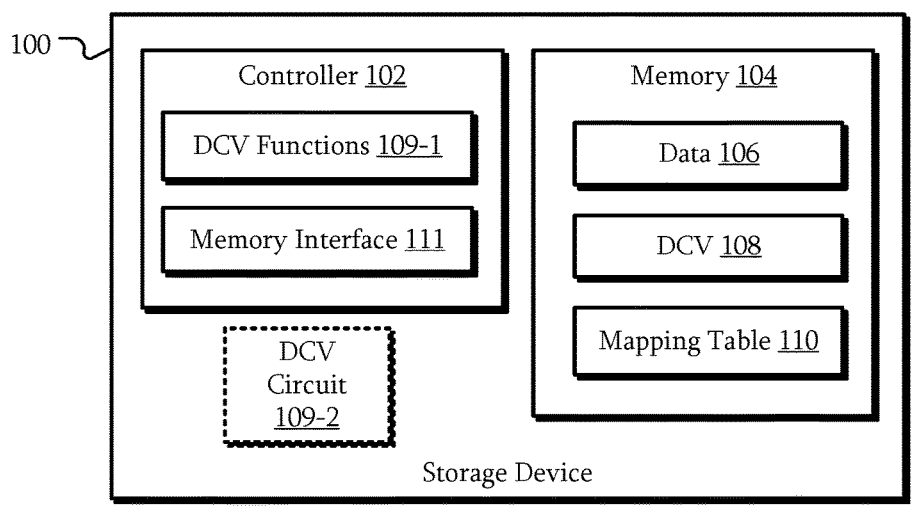
FIG. 1 is a schematic view of a storage device according to some embodiments.

The embodiments relate to versioning storage devices and methods. The following description is presented to enable one of ordinary skill in the art to make and use the embodiments and is provided in the context of a patent application and its requirements. Various modifications to the embodiments and the generic principles and features described herein will be readily apparent. The embodiments are mainly described in terms of particular methods, devices, and systems provided in particular implementations.

However, the methods, devices, and systems will operate effectively in other implementations. Phrases such as "an embodiment", "one embodiment" and "another embodiment" may refer to the same or different embodiments as well as to multiple embodiments. The embodiments will be described with respect to systems and/or devices having certain components. However, the systems and/or devices may include more or less components than those shown, and variations in the arrangement and type of the components may be made without departing from the scope of this disclosure. The embodiments will also be described in the context of particular methods having certain operations. However, the method and system may operate according to other methods having different and/or additional operations and operations in different orders and/or in parallel that are not inconsistent with the embodiments. Thus, embodiments are not intended to be limited to the particular embodiments shown, but are to be accorded the widest scope consistent with the principles and features described herein.

The embodiments are described in the context of particular systems or devices having certain components. One of ordinary skill in the art will readily recognize that embodiments are consistent with the use of systems or devices having other and/or additional components and/or other features. Methods, device, and systems may also be described in the context of single elements. However, one of ordinary skill in the art will readily recognize that the methods and systems are consistent with the use of architectures having multiple elements.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. Furthermore, in those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

FIG. 1 is a schematic view of a storage device according to some embodiments. In some embodiments, a storage device 100 includes a controller 102 and a memory 104. The controller 102 is a circuit configured to manage operation of the storage device 100 and includes components such as be a general purpose processor, a digital signal processor (DSP), an application specific integrated circuit, a microcontroller, a programmable logic device, discrete circuits, a combination of such devices, or the like. The controller 102 may include internal portions, such as registers, cache memory, processing cores, or the like, and may also include external interfaces, such as address and data bus interfaces, interrupt interfaces, or the like. Although only one controller 102 is illustrated in storage device 100, multiple controllers 102 may be present. In addition, other interface devices, such as buffers, memory interface circuitry, communication interfaces, or the like may be part of the storage device 100 to connect the controller 102 to internal and external components.

In some embodiments, the controller 102 includes a communication interface including circuitry that enables the storage device 100 to communicate. For example the communication interface may include universal serial bus (USB), small computer system interface (SCSI), peripheral component interconnect express (PCIe), serial attached SCSI (SAS), parallel ATA (PATA), serial ATA (SATA), NVM Express (NVMe), universal flash storage (UFS), Fiber channel, Ethernet, remote direct memory access (RDMA), Infiniband, or other interfaces. With such communication interfaces, the storage device 100 may be configured to communicate through the associated medium with external devices and systems. In some embodiments, the controller 102 is configured to receive read and write requests through the communication interface.

The memory 104 is any device capable of storing data. Here, one memory 104 is illustrated for the storage device 100; however, any number of memories 104 may be included in the storage device 100, including different types of memories. Examples of the memory 104 include a dynamic random access memory (DRAM), a double data rate synchronous dynamic random access memory (DDR SDRAM) according to various standards such as DDR, DDR2, DDR3, DDR4, static random access memory (SRAM), non-volatile memory such as flash memory, spin-transfer torque magentoresistive random access memory (STT-MRAM), Phase-Change RAM, nanofloating gate memory (NFGM), or polymer random access memory (PoRAM), magnetic or optical media, or the like.

The memory 104 is configured to store data 106, differentially compressed values (DCVs) 108, and a mapping table 110. As will be described in further detail below, the memory 104 may include multiple memory devices. The data stored in the memory 104 may be distributed among such devices in a variety of ways; however, for convenience, the data will be described here as being stored in a single memory 104.

The controller 102 includes a memory interface 111 coupled to the memory 104. The controller 102 is configured to access the memory 104 through the memory interface 111. The memory interface 111 may include interfaces to command, address, and/or data busses through which the controller 102 and memory 104 communicate. Although the memory 104 is illustrated as being separate from the controller 102, in some embodiments, parts of the memory 104, such as cache memory, SRAM, or the like, are part of the controller 102. The controller 102 may include internal communication busses through which internal components, such as processing cores, an external communication interface, the cache memory, or the like may communicate.

The data 106 represents data that has been stored in the storage device 100. As will be described in further detail below, the DCVs 108 represent data that, when combined with associated data 106, represent current data stored in the storage device 100. In some embodiments, a DCV 108 is a value having a size that is less than a size of corresponding data 106. For example, the data 106 and the DCV 108 may each be stored in pages having different sizes. In this example, a page for the data 106 has a size of 8K bytes. In contrast, a size of the page for the corresponding DCV 108 is 4K bytes. Although particular sizes have been used as examples, in other embodiments, the sizes are different.

The controller 102 is configured to receive a write request with write data to write to an address associated with data 106 stored in the memory 104 and a first DCV 108 stored in the memory 104. The mapping table 110 includes entries with information such logical addresses, physical addresses, DCV addresses/values, or the like to create an association between the addresses/values or other information. The mapping table 110 may use page, block, or hybrid mapping policies; however, examples herein will use block mapping for illustration.

The controller 102 is configured to use data stored in the mapping table 110 to identify a physical address, a DCV 108, or the like associated with the logical address. For example, after receiving a read or write request with the logical address through a communication interface, the controller 102 is configured to access the mapping table 110 to read an entry associated with the logical address. In some embodiments, the controller 102 is configured to access internal cache memory storing the mapping table 110; however, in other embodiments, the controller 102 is configured to access external memory, such as a DRAM.

The controller 102 is configured to read data 106 stored in the memory 104 at the physical address associated with the logical address. The controller 102 is configured to calculate a DCV based on the write data included in a write request and the data 106 read from the physical address. This calculation generates a DCV based on a difference between the data 106 stored at the physical address and the incoming write data. In addition, the calculation generates a DCV having size smaller than the data 106 read from the physical address and/or the write data.

The DCV may be calculated in a variety of ways. In some embodiments, the controller 102 is configured to calculate the DCV in software or an internal circuit. DCV functions 109-1 represent this operation of the controller 102. That is, after the controller 102 has received the write data and the read data 106 from the physical address, the controller 102 is configured to perform a mathematical calculation using the write data and the read data 106 from the memory 104 to generate the DCV. In other embodiments, the controller 102 uses an external circuit to calculate the DCV. For example, controller 102 is configured to direct the write data and the read data to a DCV circuit 109-2 and, in response, the DCV circuit 109-2 is configured to generate the DCV. The DCV circuit 109-2 includes arithmetic units, lookup tables, input/output buffers, or the like to calculate the DCV and interface with the controller 102 and/or the memory 104. The DCV circuit 109-2 is illustrated with a dashed line to indicate that it may be used as an alternative to or in conjunction with the DCV functions 109-1 of the controller 102.

A variety of functions performed by the controller 102 directly or indirectly through the DCV circuit 109-2 may be used to generate the DCV. In some embodiments, the function is a simple subtraction operation. In other embodiments, the function is a more complex hash function. In other embodiments, records can be created indicating which bits have flipped. In some embodiments, the function may be referred to as a "diff" function. In particular embodiments, the function is optimized to reduce the size of the DCV. In some embodiments, the function includes a compression function to reduce a size of a difference.

The controller 102 is also configured to directly or indirectly through the DCV circuit 109-2 perform a function that is the inverse of the DCV function. The inverse DCV function is a function that uses as inputs a source data and a DCV, generated from the source data and different data, to regenerate the different data. Accordingly, by maintaining the data 106 and the DCV 108, the different data is available through the inverse DCV function.

The controller 102 is configured to store a calculated DCV in the memory 104. For example, the controller 102 is configured to store the DCV with the DCVs 108 in the memory 104. However, as will be described in further detail below, in other embodiments, the DCV may be cached in one or more other portions of the memory 104 before being stored with the DCVs 108.

The controller 102 is configured to change the association of the address to reference the calculated DCV instead of an earlier DCV associated with the address. As will be described in further detail below, when the data 106 associated with the address is read, the new DCV will now be accessed instead of the earlier DCV. In other words, in some embodiments, only one DCV is maintained to represent data associated with an address.

In some embodiments, at least a portion of the memory 104 has an asymmetric performance with respect to writes. For example, flash memory based storage devices do not allow in-place writes. A new block must be allocated for the write and, to prepare for future writes, the previous block must be erased. In storage devices with shingled magnetic recording, writing to a track that overlaps another track includes rewriting the overlapping track. As will be described in further detail below, by using DCVs, an effect of the asymmetric performance may be reduced.

Figure 2A:
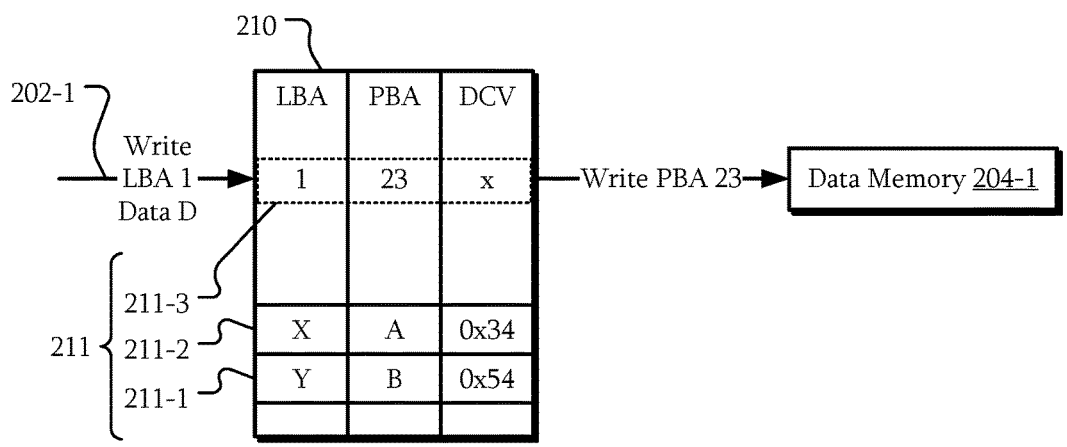
FIGS. 2A-2E are schematic views of writing to a storage device according to some embodiments.

FIGS. 2A-2E are schematic views of writing to a storage device according to some embodiments. The storage device 100 of FIG. 1 will be used as an example. Referring to FIGS. 1 and 2A, in some embodiments, a mapping table 210 corresponds to the mapping table 110 stored in the memory 104. The mapping table 210 includes multiple entries 211. Each entry 211 includes a field for a logical block address (LBA), a physical block address (PBA), and an indication of a DCV. Although particular fields have been used as example, in other embodiments, other fields may be present and/or the fields may take different forms. For example, here, the logical and physical addresses are associated with blocks; however, in other embodiments, the logical and physical addresses may be associated with pages within blocks or other organizations of the memory 104. In other embodiments, a single address, such as a physical address, may be the only address present.

In the mapping table 210, two entries 211-1 and 211-2 are preexisting entries. When a write request 202-1 to a new logical block address is received, a new entry 211-3 is created by the controller 102. In this example, the new entry 211-3 is for logical block address 1. The controller 102 has associated logical block address 1 with physical block address 23. However, as the only data associated with the physical block address is the incoming data D, for example, the data D is associated with a new file, a DCV is not calculated. That is, no valid data exists at physical address 23 in the data memory 204-1. The "x" in the DCV field represents the indication that a DCV does not exist or is not valid. In some embodiments, a flag represents whether the DCV exists or is valid. In other embodiments, a particular address/value of the field may be defined as the indication that the DCV does not exist or is not valid. In still other embodiments, the DCV field may not be part of the entry 211-3. The indication that the DCV does not exist or is not valid may take other forms.

Because the write request 202-1 is associated with a new entry 211-3, the controller 102 is configured to store the data D in physical block address 23 of the data memory 204-1. This data memory 204-1 represents the portion of the memory 104 where data 106 is stored. Accordingly, a new, valid entry 211-3 is created referencing data stored in the data memory 204-1. Although the data D has been described as being written to the data memory 204-1, in other embodiments, various buffering, caching, or the like is performed as part of that writing before committing the data D to the data memory 204-1.

Figure 2B:
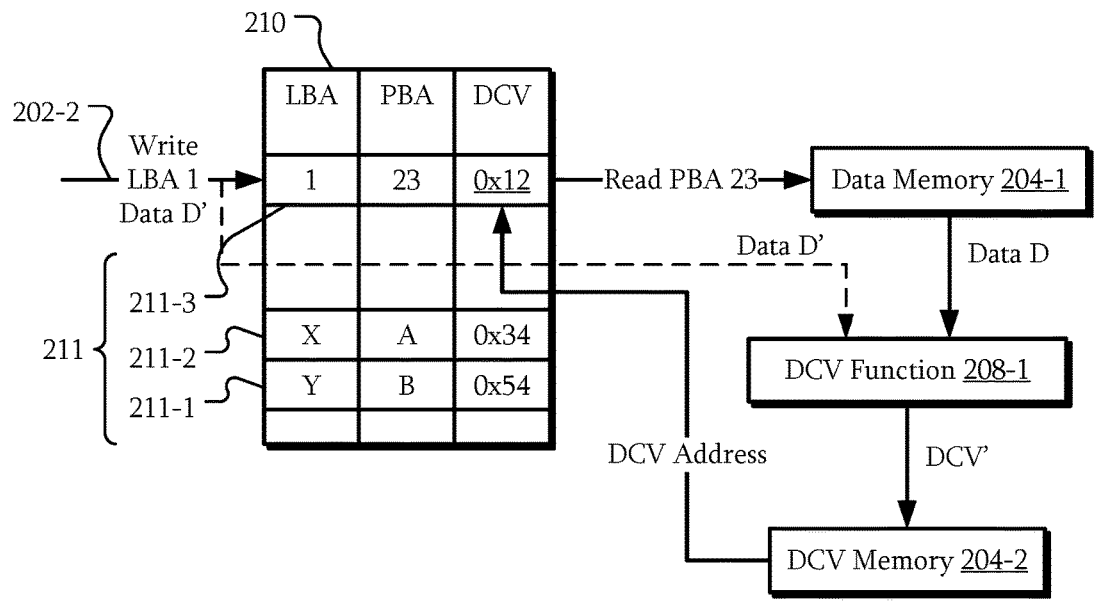

Referring to FIGS. 1 and 2B, in some embodiments, a new write request 202-2 is received. Again, the write request 202-2 is directed towards logical block address 1. However, as the entry 211-3 exists, data has already been stored in the associated physical block address of the data memory 204-1, i.e., data D from FIG. 2A. Accordingly, this write request 202-2 is intended to update the data stored in logical block address 1 with new data D'.

In contrast to the original writing of data D, described above with respect to FIG. 2A, here, data D' is not written to the physical block address 23 of the data memory 204-1. The controller 102 is configured to determine if an entry 211 exists in the mapping table 210. In some embodiments, the controller 102 compares the logical block address of the write request to logical block addresses of existing entries 211. If a match if found, then a previous write has occurred and data exists in the data memory 204-1. The controller 102 is configured to read the data D stored in the associated physical block address. Here, the controller 102 reads from physical block address 23. Data D, previously written as described in FIG. 2A, is read out of the data memory 204-1.

The new data D' of the write request 202-2 and the existing data D from the data memory 204-1 are used as inputs to the DCV function 208-1. The DCV function 208-1 represents the operation performed by the controller 102 to calculate a DCV as described above. The DCV function 208-1 is configured to generate DCV' based on the new data D' and the existing data D. Here, the DCV' is labelled with an apostrophe to indicate that this DCV' may be combined with the data D to generate the data D'.

The controller 102 is configured to store the new DCV' in the DCV memory 204-2. In some embodiments, the controller 102 is configured to store a DCV address in the DCV field of the entry 211-3 in the mapping table 210. Here, the value of 0x12 is illustrated with underlining to indicate that the value is new or has been changed. In other embodiments, the DCV memory 204-2 may not be used and the DCV' may be stored in the DCV field of the entry 211-3. For example, the DCVs may be relatively small and thus, an additional amount of memory to store the DCVs in the entries 211 may be relatively small. Regardless, the entry 211-3 now has an association of a logical block address, a physical block address, and a DCV.

Figure 2C:
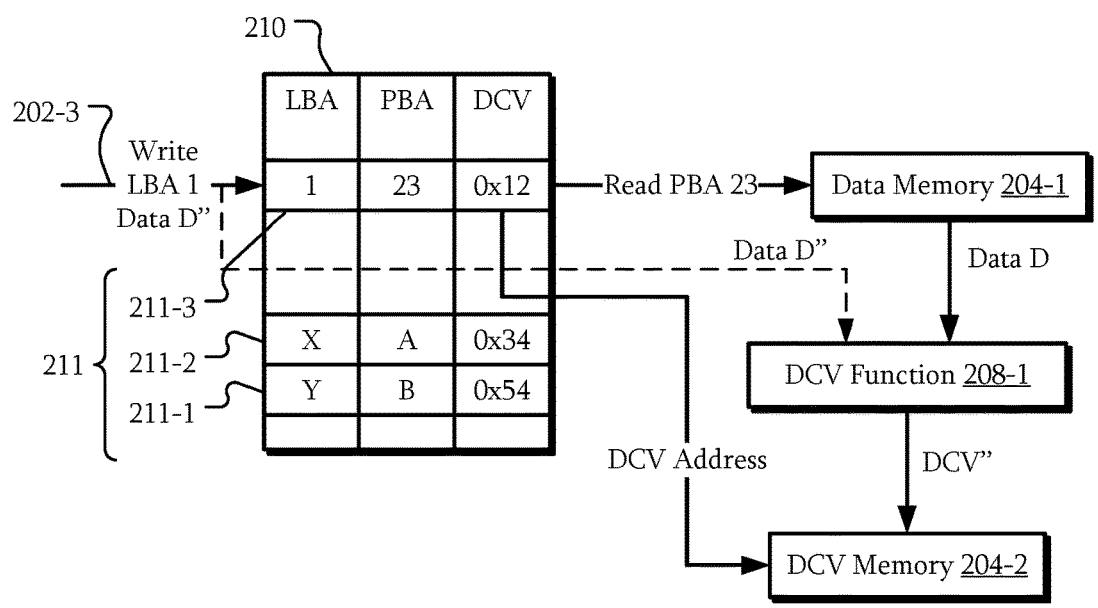

Referring to FIGS. 1 and 2C, in some embodiments, another write request 202-3 is received by the controller 102. This write request 202-3 is a request to write new data D" to logical block address 1. Again, the controller 102 is configured to attempt to find a match in the mapping table 210. Here, entry 211-3 exists. Similar to FIG. 2B, the controller 102 is configured to read data D from physical block address 23 indicated in the entry 211-3. Data D is output from the data memory 204-1.

The new data D" of the write request 202-3 and the existing data D from the data memory 204-1 are used as inputs to the DCV function 208-1. The DCV function 208-1 is configured to generate a new DCV" based on the new data D" and the existing data D. In particular, the generation of the DCV" did not involve the intermediate state of the data D' that was written in FIG. 2B. As the data D was the data stored in the data memory 204-1 at physical block address 23, the difference of interest is the difference between that data D and the data to be written, data D". The controller 102 is configured to store the resulting DCV" in the DCV memory 204-2. The controller 102 is configured to use the DCV address in the DCV field of the entry 211-3 to overwrite the preexisting DCV' with the new DCV". Accordingly, the DCV field in the entry 211-3 now references the new DCV".

Figure 2D:
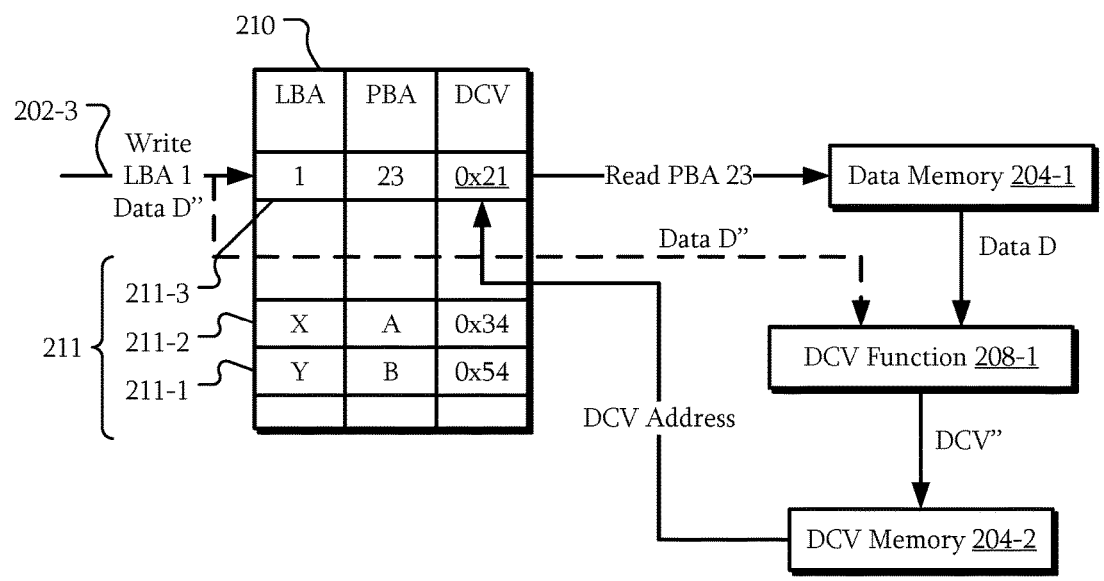

Referring to FIGS. 1 and 2D, the operations may be similar to those described with respect to FIG. 2C. However, in some embodiments, writing the DCV" to the DCV memory 204-2 may result in a new DCV address. For example, if the DCV memory 204-2 is implemented in flash memory, the new DCV" may be written to a page in the DCV memory 204-2 different from a page storing the DCV'. The new DCV address is the address in the DCV memory 204-2 in which the DCV" was stored. In the entry 211-3, the new address is represented by 0x21 and underlined to indicate the change in the DCV field.

Although updating a memory location at the same address in the DCV 204-2 or updating the entry 211-3 with a new address have been used as examples of how to change the association of the logical block address with the DCV to reference a new DCV, in other embodiments, the change in the association may be different. For example, in some embodiments, the controller 102 is configured to store the DCV" in the mapping table, such as in the DCV field. The DCV' stored in the entry 211-3 may be replaced with the DCV".

Figure 2E:
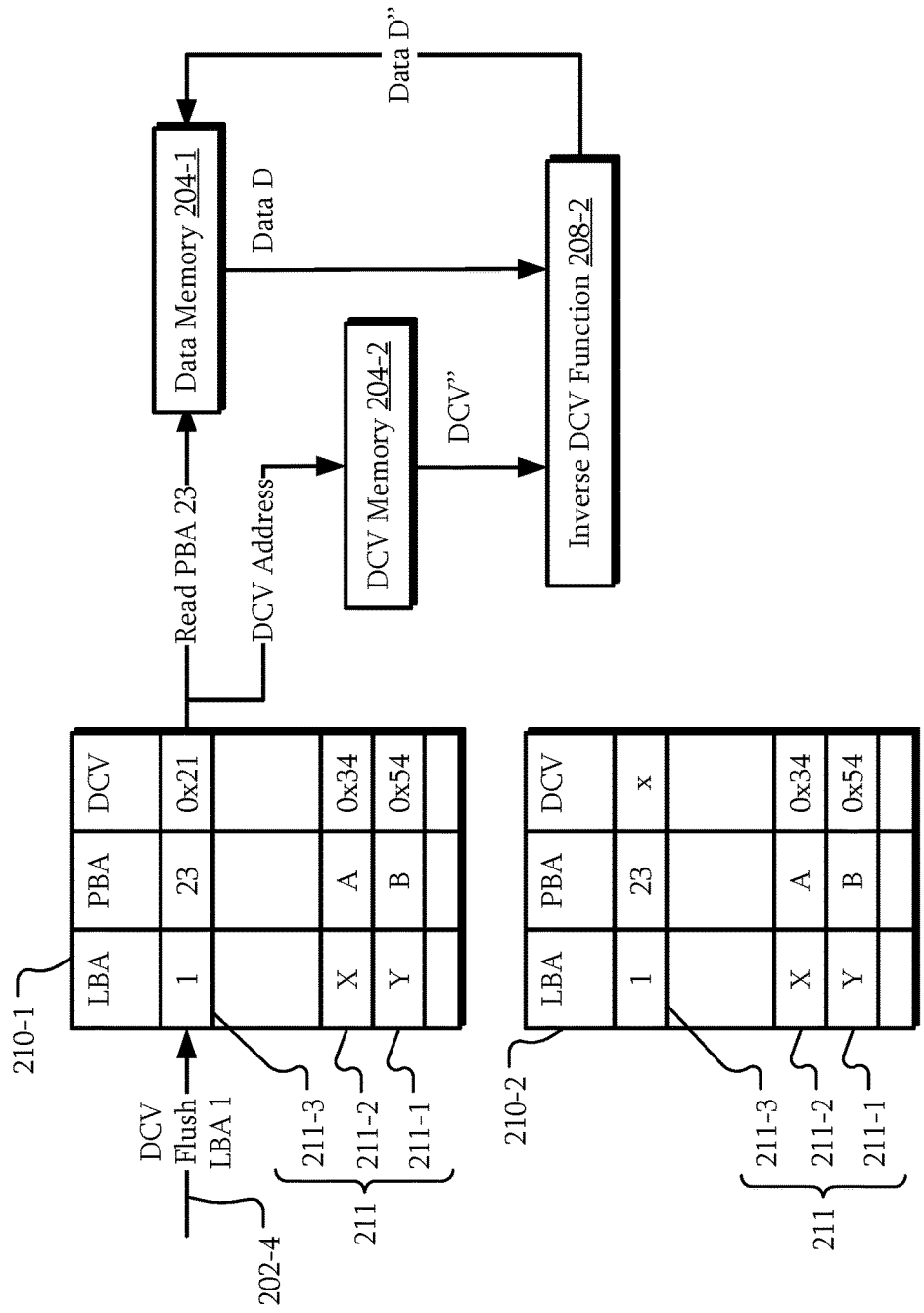

Referring to FIGS. 1 and 2E, in some embodiments, the controller 102 is configured to receive a DCV flush access 202-4. Here the DCV flush access 202-4 indicates logical block address 1 similar to the figures described above. The mapping table 210 is in an initial state 210-1 similar to the mapping table 210 of FIG. 2D.

Again, the controller 102 is configured to access the entry 211-3 and read data D from the associated physical block address 23 in data memory 204-1. However, the controller 102 is configured to use the DCV field to access the DCV" stored in the DCV memory 204-2. Here, the controller 102 is configured to use the DCV address to access the DCV memory 204-2.

The controller 102 is configured to supply the DCV" and the data D to an inverse DCV function 208-2. The inverse DCV function 208-2 represents the function to combine data and a DCV to produce an updated version of the data as described above. Here, the DCV function 208-2 uses the data D and the DCV" to recreate data D". The controller 102 is configured to store the data D" in the data memory 204-1 in place of the data D. Mapping table 210 is updated to state 210-2. Here entry 211-3 is updated to indicate that a valid DCV does not exist, represented by the "x". Accordingly, a subsequent write to logical block address 1 may be handled by the controller 102 as described above in FIG. 2B.

As a result of the operations described above, frequently modified data has a reduced impact on performance in storage devices with memories 104 having asymmetric performance. For example, data that is consistently being modified may include less than 5% of an entire data set. Using 200 GB as an example, only 1% or 2 GB may be consistently updated. The smaller size of the DCVs reduces an amount of data that is written. In some applications, a majority of DCV may be on the order of 20% of a size of an entire block of data. A majority of the remainder may still be less than 50% of the size of the block. Accordingly, in the 200 GB example, 400 MB to 1 GB of DCVs may be written. The reduced size results in space efficiency and may reduce wear. In particular, an update that would have used 2 GB of newly erased blocks now may use 400 MB. For a given capacity of a storage device, reducing the requirement on newly erased blocks allows garbage collection to be performed less frequently and reduces the frequency of wear on the medium.

Figure 3A:
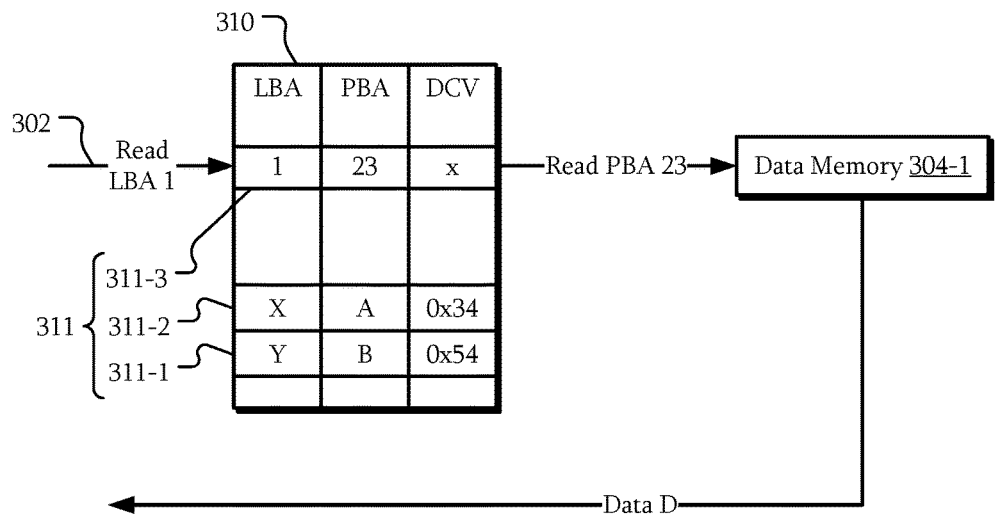
FIGS. 3A-3E are schematic views of reading from a storage device according to some embodiments.

FIGS. 3A-3E are schematic views of reading from a storage device according to some embodiments. The storage device 100 of FIG. 1 will be used as an example. In FIGS. 3A-3D, description of elements similar to those of FIGS. 2A-2E will be omitted for brevity. Referring to FIGS. 1 and 3A, the mapping table 310 represents a state after data is written as described in FIG. 2A. That is, data D has been stored in the data memory 304-1 and an entry 311-3 has been added to the mapping table 310; however, the entry 311-3 includes an indication that the DCV does not exist or is not valid.

The controller 102 is configured to receive a read request 302. Here, the read request 302 is a request to read logical block address 1. In response the controller 102 is configured to access the mapping table 310 and read the physical block address 23. Using the physical block address, the controller 102 is configured to read the data D from the data memory 304-1. The controller 102 is configured to respond to the read request 302 with the data D. In particular, because the entry 311-3 includes the indication that the DCV does not exist or is not valid, the controller 102 is configured to respond with the data D without modification.

Figure 3B:
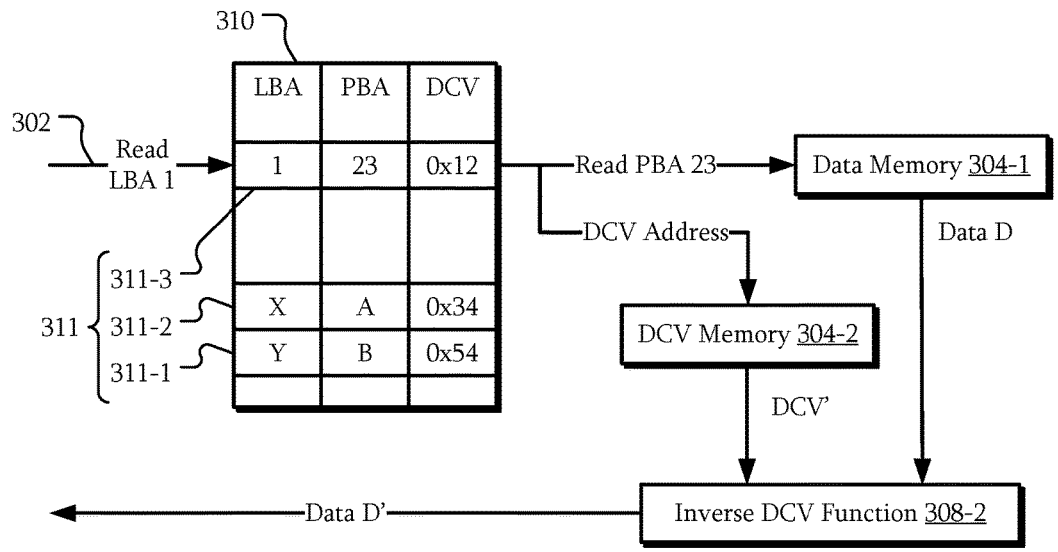

Referring to FIGS. 1 and 3B, in some embodiments, the read request 302 may be received by the controller 102 when the mapping table 310 is in the state after data is written as described in FIG. 2B. That is, data D was initially written to the data memory 304-1 and an updated data D' was written, resulting in DCV' being stored in the DCV memory 304-2.

Accordingly, the controller 102 is configured to again receive the read request 302 and in response, read the data D from the data memory 304-1 by accessing physical block address 23. However, as a valid DCV field is present in the entry 311-3, the controller 102 is configured to access the DCV memory 304-2 to read the DCV'. The controller 102 is configured to use the data D and the DCV' as the inputs to the inverse DCV function 308-2 to combine the data D and the DCV' into the data D'. The controller 102 is configured to respond to the read request 302 with the data D'.

While an increased amount of reading is involved in this technique, that increased amount of reading may have a small if not negligible impact. For example, in some embodiments, internal read bandwidths of the memory 104 are higher than external interface bandwidths of the storage device 100. Even with a non-negligible impact on read performance, reads do not result in usage of erased blocks, rewriting of adjacent tracks, or the like. Thus, operations that could reduce read performance have less of an impact than the associated operations that reduce latency, improve latency consistency, or the like.

Figure 3C:
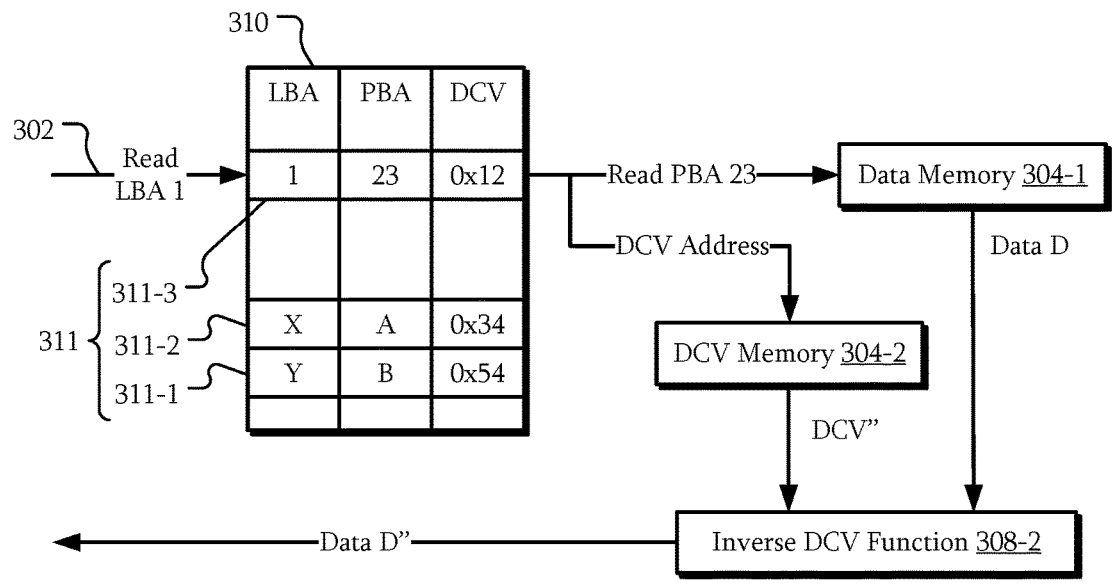

Referring to FIGS. 1 and 3C, in some embodiments, the read request 302 may be received by the controller 102 when the mapping table 310 is in the state after data is written as described in FIG. 2C. That is, data D was initially written to the data memory 304-1, an updated data D' was written resulting in DCV' being stored in the DCV memory 304-2, and a further updated data D" was written, resulting in DCV" being stored in the DCV memory 304-2.

The controller 102 is once again configured to access the entry 311-3 for the physical block address 23, access the data memory 304-1 using the physical block address 23 to access data D, and use the DCV address to access the DCV memory 304-2. However, as the data D" was the most recently data written to logical block address 1, the DCV" is the DCV that is available and accessed in the DCV memory 304-2.

The controller 102 is configured to use the DCV" and the data D as inputs to the inverse DCV function 308-2 to generate the data D". The controller 102 is configured to respond to the read request 302 with the data D". Accordingly, even though the initial data D was accessed, the most recent data D" may be regenerated. In particular, the data D' and the associated DCV' were not used in generating the data D".

As illustrated in FIGS. 3A-3C, the controller 102 is configured to operate differently based on whether the DCV field indicates that the DCV is present or valid. However, in other embodiments, the controller 102 may be configured to operate similar to FIGS. 3B and 3C even when only initial data has been stored in the data memory 304-1. In particular, the DCV field of an entry 311 may be initialized to indicate an identity DCV, whether in the DCV field itself or within the DCV memory 304-2. The identity DCV indicates, when used as an input to the inverse DCV function 308-2 with initial data D, generates the data D. As a result, substantially identical operations may be performed by the controller 102 regardless of whether a DCV from comparing actual data exists or is valid.

Figure 3D:
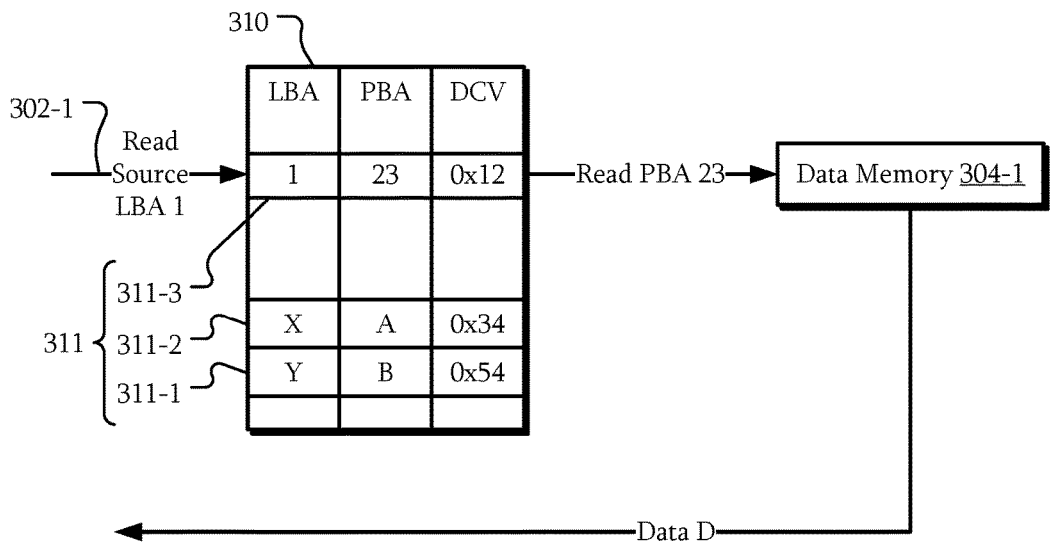

Referring to FIGS. 1 and 3D, in some embodiments the earlier initial version of the data D is accessible. In particular, the controller 102 may be configured to receive a source read request 302-1. Here the source read request 302-1 references logical block address 1. In response the controller 102 is configured to access the data D in physical block address 23 of the data memory 304-1 similar to the access describe with respect to FIG. 3A. However, the DCV field of the entry 311-3 is valid, similar to FIGS. 3B and 3C. That is, an updated version of the data in logical block address 1 exists. In contrast to FIGS. 3B and 3C, the initial data D is returned rather than the regenerated current data D' or D". Accordingly, a request or requests similar to the source read request 302-1 may be used to read an earlier version of data stored on the storage device 100.

While reading a DCV address from the DCV field of the entry 311-3 is used as an example, in other embodiments the DCV value is read from the DCV field of the entry 311-3. For example, the DCV' and the DCV" of FIGS. 3B and 3C, respectively, may be read from the entry 311-3.

Figure 3E:
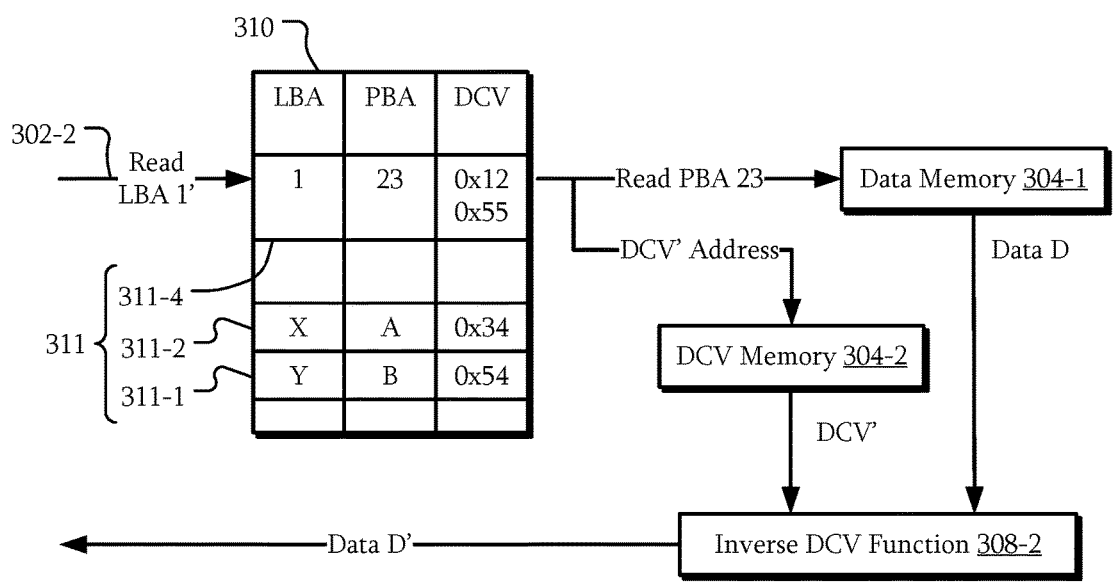

Referring to FIGS. 1 and 3E, in some embodiments, the read request 302-2 may be received by the controller 102 when the mapping table 310 is in the state after data is written as described in FIG. 2C. That is, data D was initially written to the data memory 304-1, an updated data D' was written resulting in DCV' being stored in the DCV memory 304-2, and a further updated data D" was written, resulting in DCV" being stored in the DCV memory 304-2. However, in this embodiment, one or more intermediate DCVs are maintained. In this example, the DCV" is the current DCV; however, DCV' is also maintained. The additional parameter of 0x55 in entry 311-4 represents the indication of the DCV', i.e., its value or address.

In this example, the read request 302-2 is a request for LBA 1'. LBA 1' represents the state of the data as data D'. Accordingly, the controller 102 is configured to access the DCV' address, the address of the location where DCV' is stored in the DCV memory 304-2. As a result, the DCV' may be accessed and combined with the data D in the inverse DCV function 308-2 to generate the data D'.

Although only one intermediate DCV, i.e., DCV', is used as an example, in other embodiments, any number of intermediate DCVs may be stored. For example, DCVs DCV', DCV", DCV''', and DCV"" may all be stored in the DCV memory 304-2. Each of these DCVs may be combined with the data D to generate a later version of the data such as data D', D", D''', and D"", respectively.

Figure 4A:
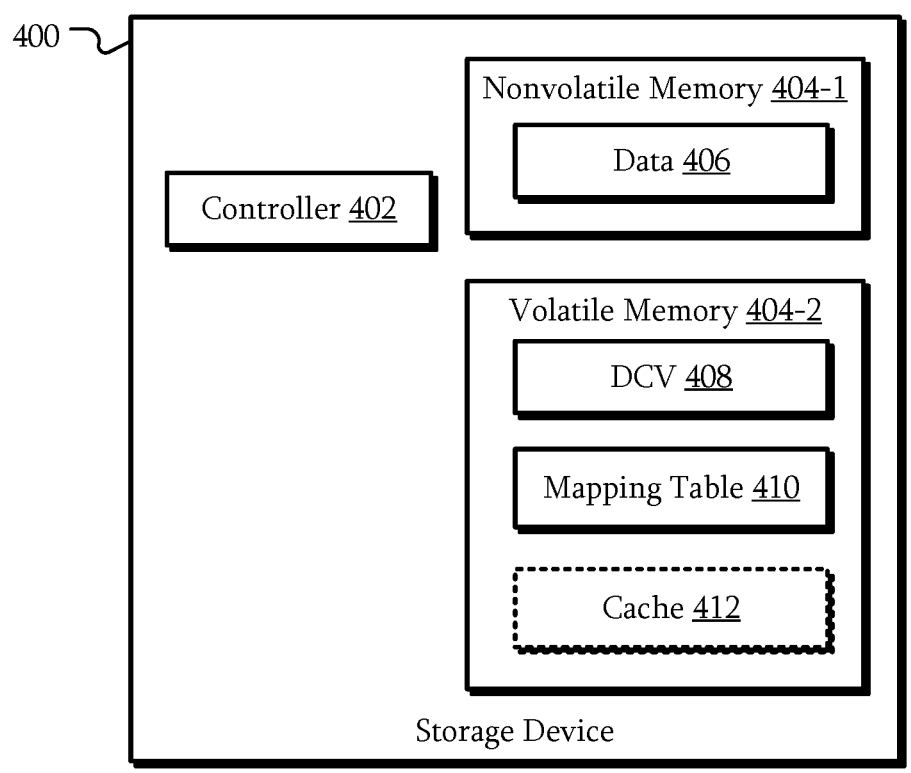
FIGS. 4A-4B are schematic views of storage devices according to some embodiments.
Figure 4B:
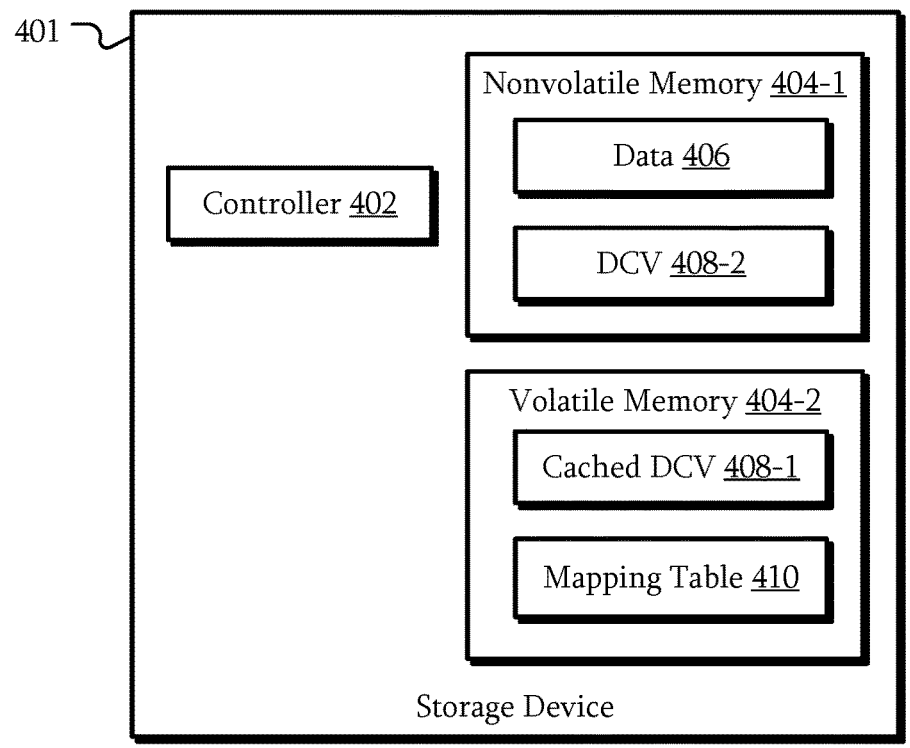

FIGS. 4A-4B are schematic views of storage devices according to some embodiments. Referring to FIG. 4A, in some embodiments a storage device 400 includes a controller 402 similar to the controller 102 of storage device 100 of FIG. 1. However, the storage device includes a nonvolatile memory 404-1 and a volatile memory 404-2. Examples of the nonvolatile memory 404-1 include memory such as flash memory, STT-MRAM, Phase-Change RAM, NFGM, or PoRAM, magnetic or optical media, or the like. Examples of the volatile memory 404-2 include a DRAM, a DDR SDRAM according to various standards such as DDR, DDR2, DDR3, DDR4, SRAM, or the like.

The controller 402 is configured to store data 406 in the nonvolatile memory 404-1 and store DCVs 408 in the volatile memory 404-2. The controller 402 may also be configured to store the mapping table 410 in the volatile memory 404-2.

In some embodiments, uses of storage device 400 prioritize consistent latency higher than consistency. Accordingly, consistency of the data may be relaxed. For example, several internet-scale applications consider consistency within relaxed bounds to be acceptable. Such applications include tweets and photo tagging. However, for such applications, latency spikes may be unacceptable. Data within these bounds, as represented by the DCVs 408, is stored in the volatile memory 404-2. The controller 402 is configured to flush overflows of the DCV 408 to the nonvolatile memory 404-1. In some embodiments, the controller 402 is configured to flush the DCVs 408 to the data 406 of the nonvolatile memory 404-1 as described above in FIG. 2E. While the volatile memory 404-2 may be backed by a battery, super-capacitor, or NVRAM; however, in some embodiments, such a backup is not necessary as a failure resulting the loss of the DCVs 408 would still be within the acceptable bounds. Omitting a battery, a super-capacitor, or NVRAM used for backup may reduce a cost of the storage device 400.

In some embodiments, a cache 412 may be used to cache data before committing the data to the non-volatile memory. For example, data from the write requests described in FIGS. 2A-2D may be stored in the cache 412. This storage is performed without the various techniques described in FIGS. 2A-2D. However, when data is evicted from the cache 412, committed from the cache 412, or the like, the techniques described in FIGS. 2A-2D may be used. In a particular example, a data block stored in the cache 412 may be updated by multiple write requests. These updates do not involve the calculation of a DCV. When that data block is to be evicted or committed, a DCV may be generated as described in FIGS. 2A-2D based on the state of the data when it is evicted or committed.

Referring to FIG. 4B, in some embodiments, the storage device 401 is similar to the storage device 400 of FIG. 4A. However, in the storage device 401 the controller 402 is configured to cache DCVs in the volatile memory 402-2, represented by the cached DCV 408-1. In particular, the controller 402 is configured to maintain frequently accessed DCVs in the volatile memory 404-2. The controller 402 is configured to use a caching algorithm, heuristics, or the like to determine which DCVs 408-1 to maintain in the cache. The controller 402 is configured to transfer other DCVs 408-1 to the DCVs 408-2 stored in the nonvolatile memory 404-1 and vice versa. As a result, in some embodiments, frequently accessed or heavily accessed data may be cached. Moreover, as the DCVs 408-1 are smaller in size than the corresponding data 406, a greater number of updates may be maintained in the volatile memory 404-2 than if the actual data was cached.

Figure 5:
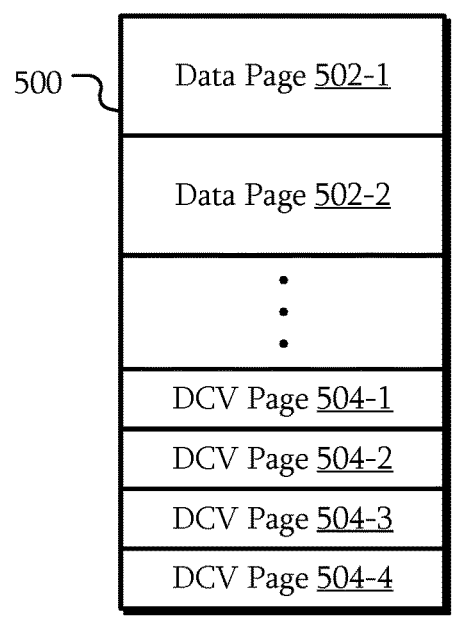
FIG. 5 is a schematic view of page sizes in a storage device according to some embodiments.

FIG. 5 is a schematic view of page sizes in a storage device according to some embodiments. In some embodiments, the data pages 502 and DCV pages 504 are stored in the same memory 500. Here, data pages 502-1 and 502-2 and DCV pages 504-1 to 504-4 are examples of data pages 502 and DCV pages 504 stored in the memory 500. Here, the DCV pages 504 are illustrated as smaller to represent the smaller size of the DCVs relative to the source data. In this example, the DCV pages 504 are half the size of the data pages 502; however, in other embodiments, the sizes of the DCV pages 504 are different depending on the particular DCV function used.

In some embodiments, both the data pages 502 and DCV pages 504 may be subject to the same restrictions, such as a lack of in-place writes, that may increase latency. As described above, the data page 502 is generally maintained while the DCV changes, resulting in changes to the DCV pages incurring the latency impact. However, as the DCV pages 504 are smaller in size, the latency impact may be reduced. For example, the DCV pages 504 may be stored in different blocks from the data pages 502. Accordingly, as more DCVs accumulate in the DCV pages 504, garbage collection may be performed on those blocks to recover free blocks. Because the DCV pages 504 are smaller, garbage collection may take less time and/or be performed less frequently. In addition, the data pages 502 may remain valid for longer than the DCV pages 504. As a result, blocks storing the data pages 502 would be less likely to undergo garbage collection than blocks storing the DCV pages 504. Furthermore, as the DCV pages 504 may be more likely to be invalidated quickly, more pages in a block storing DCV pages 504 would be invalid, reducing a time for a garbage collection operation as less valid pages would need to be copied.

Figure 6:
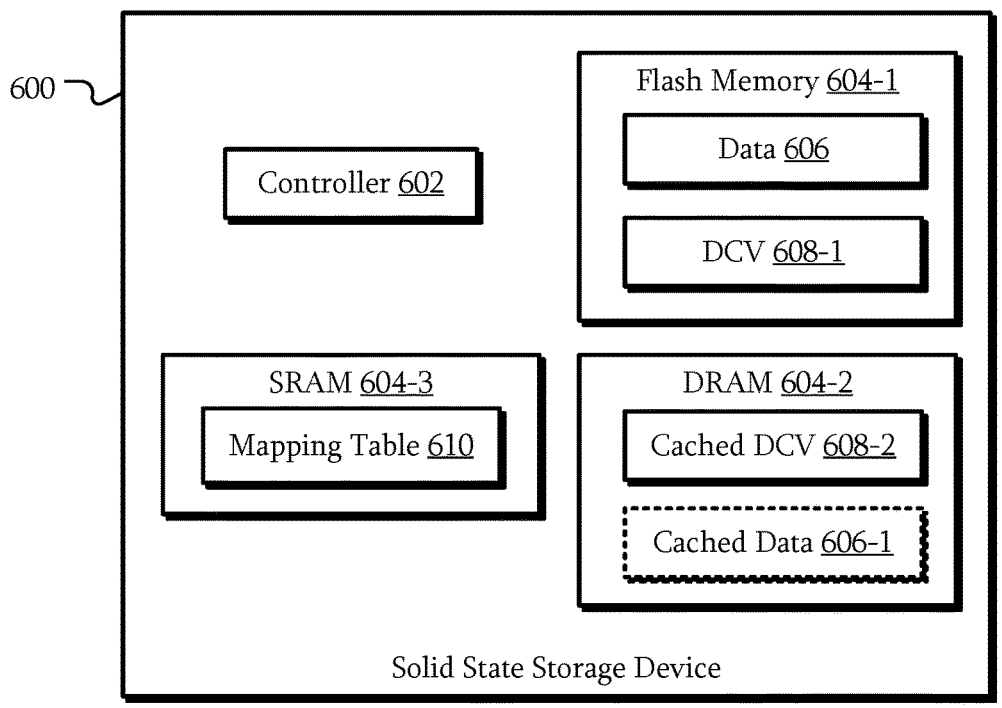
FIG. 6 is a schematic view of a solid state storage device according to some embodiments.

FIG. 6 is a schematic view of a solid state storage device according to some embodiments. In some embodiments, an SSD 600 includes a controller 602 similar to the controller 102 of the storage device 100 of FIG. 1. However, the SSD 600 includes flash memory 604-1, DRAM 604-2, and SRAM 604-3. The controller 602 is configured to store data 606 and DCVs 608-1 in the flash memory 604-1, cache the DCVs 608-2 in the DRAM 604-2, and store the mapping table 610 in the SRAM 604-3. Although a particular, configuration of memories has been described, in other embodiments, the SSD 600 includes different memories in different configurations and/or the distribution of the data 606, DCVs 608-1 and 608-2, and the mapping table 610 is different. For example, the SSD 600 may have configurations similar to FIGS. 1, 4A, and 4B.

The data 606 and the DCV 608-1, being stored in the flash memory 604-1, are susceptible to garbage collection where pages containing the data 606 and the DCV 608-1 are erased, potentially incurring additional latency. However, as described above, sizes of the DCV 608-1 are smaller than the corresponding data 606. That is, pages in the flash memory 604-1 used to store the data 606 are larger than pages used to store the DCV 608-1.

Using the DSVs reduces the write modifications (out-of-place updates) in SSD 600. This results in minimizing invalid blocks which may need to be reclaimed. This in-turn reduces a frequency of garbage collection. In particular, the SSD 600 may handle update-heavy I/O traffic, such as with big-data and cloud applications, with a lower frequency of garbage collection and hence a lower chance of a higher latency and, in particular, latency spikes. Specifically, on write-updates to the data 606, the first copy of the data 606 remains valid in the flash memory 604-1. The DCVs 608-1 in the flash memory 604-1 and cached in the DRAM 604-2 as the cached DCV 608-2 increases the lifetime of pages in the flash memory 604-1, even for write update heavy workloads. In addition, as described above, an earlier version of the data 606 is available. In addition to improving the latency, the architecture may improve flash cell wearing.

In particular, instead of invalidating the previous page, and requesting a new page for update data, the controller 602 is configured to maintain the previous page as valid/active in the flash memory 604-1 along with a DCV representing a difference between the previous page and the update. On a subsequent read operation, both the previous page and the DCV are concurrently read by the controller 602 and combined provide the most up to date page. As described above, there are multiple configurations for where to store the DCVs, such as within flash memory 604-1, DRAM 604-2, SRAM 604-3, or a combination of such memories. In addition the DCVs may be cached, such as by caching active or "hot" page DCVs on the DRAM 604-2 and maintaining the persistent copy on the flash memory 604-1 in the DCV 608-1.

In some embodiments, even when reads and writes are not asymmetric, have the same overhead, or the like, a storage device as described herein still may have a performance benefit. In particular, if write times scale with the size of the writes and sizes of the DCV are smaller than the sizes of corresponding data blocks, the write time may be reduced.

In some embodiments, the DRAM 604-2 is used to cache write requests and/or write data. When processing a write request involves reading existing data in the data 606, the corresponding data 606 is stored in the DRAM 604-2 as cached data 606-1. The controller 602 is configured to use the cached data 606-1 stored in the DRAM 604-2 as an input to the DCV functions described above. That is, instead of reading the data from the data 606 stored in the flash memory 604-1, the controller 602 is configured to read the data from the cached data 606-1 stored in the DRAM 604-2.

In some embodiments, the flash memory 604-1 is divided into planes and channels. The SSD 600 reads and writes at page granularity, and erases at block granularity, which can include several pages. The mapping strategy defines the granularity of translation, i.e., page-level mapping may need a larger footprint but offers a higher degree of flexibility. Block-level mapping may use a smaller footprint, but can be restrictive on placement. Several variations of "hybrid" policies have been proposed to utilize a combination of both page and block based mapping. The mapping in the mapping table 610 may use any of such mapping techniques.

Although an SSD 600 has been described as an example, in other embodiments, other types of storage media, such as shingled magnetic drives may be used. In particular, on a shingled disk, writes may overlap part of the previously written magnetic tracks. This leads to reduction in write performance, and also results in overwriting the adjacent tracks. Shingled magnetic drives hide this complexity by managing this in the firmware. Lower write performance (when writing to adjacent tracks) may lead to inconsistent latency, and is a concern for most cloud applications. Using DCVs as described herein reduces overwrites, hence providing consistent transaction latency for update-intensive workloads.

Figure 7:
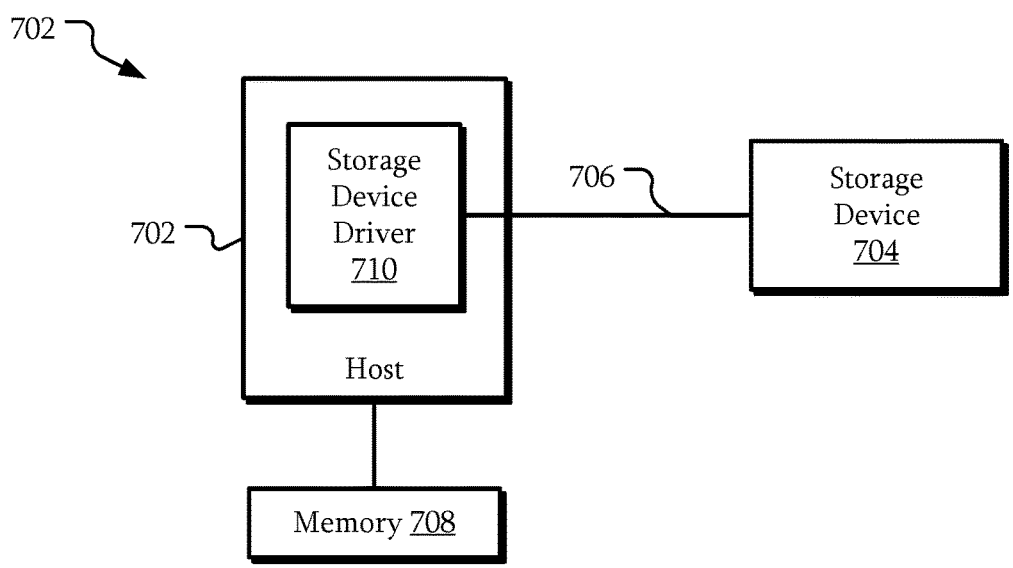
FIG. 7 is a schematic view of a system with a versioning storage system according to some embodiments.

FIG. 7 is a schematic view of a system with a versioning storage system according to some embodiments. In some embodiments, a system 700 includes a host 702 coupled to a storage device 704 by a communication link 706. The host 702 is a system that uses data storage capabilities of the storage device, such as a general purpose processor, a digital signal processor (DSP), an application specific integrated circuit, a microcontroller, a programmable logic device, discrete circuits, a combination of such devices, or the like. In some embodiments, the host 702 is a computer, server, workstation, or the like. The host 702 is configured to execute software, such an operating system and applications.

The host 702 is coupled to memory 708. Memory 708 includes operational memory and/or cache memory for the host 702, such as a DRAM, a DDR SDRAM according to various standards such as DDR, DDR2, DDR3, DDR4, SRAM, or the like. Although the memory 708 is illustrated as separate from the host 702, in some embodiments, the memory 708 is part of the host 702.

The communication link 706 represents a medium through which the host 702 and the storage device 704 are configured to communicate. For example, the communication link 706 is a link such as USB, SCSI, PCIe, SAS, PATA, SATA, NVMe, UFS, Fiber channel, Ethernet, RDMA, Infiniband, or other similar links. Each of the host 702 and the storage device 704 are configured to have interfaces to communicate over such communication links.

In some embodiments, the storage device 704 is a storage device as described above similar to storage devices 100, 400, 401, and 600 and configured to operate as described above, such as in FIGS. 2A-3D. The host 702 may be configured to read and write data to the storage device 704. The storage device 704 is configured as described above to use DCVs to improve operations of the system 700.

However, in other embodiments, the host 702 is configured to perform operations similar to those described above with respect to DCVs. For example, the host 702 may include a storage device driver 710. The storage device driver 710 represents software executable on the host 702 that operates with the storage device 704.

In particular, the storage device driver 710 is configured to perform operations similar to those described above with respect to DSVs. That is, the operations described above performed by a controller 102, 402, 602, or the like are performed by the storage device driver 710. In addition, the memory 708 is used similar to at least part of the memories 104, 404-2, 604-2, and 604-3. That is, the memory 708 is used, for example, to store a mapping table 110, 410, or 610, DCVs 108 or 408, and/or cached DCVs 408-1 or 608-2.

In some embodiments, the association of a logical block address and a physical block address described with respect to FIGS. 2A-3D need not be present in a mapping table. The storage device driver 710 may be configured to maintain an association of logical addresses and indications of DCVs. That is, the storage device driver 710 is configured to use the logical block address similarly to the physical block address as an indication of where the initial data D is stored. In some embodiments, the storage device driver 710 is configured to use the storage device 704 as the data memory 204-1 or 304-1 described with respect to FIGS. 2A-3D.

In some embodiments, for a logical block address, the storage device driver 710 is configured to write initial data to the logical block address on the storage device 704. The storage device driver 710 is configured to cache the initial data in the memory 708. On a subsequent change to the data, the storage device driver 710 is configured to calculate a DCV using the cached initial data and write the DCV to the storage device. In other embodiments, the storage device driver 710 is configured to maintain the DCVs in the memory 708. Any of the DCV management techniques described above may be used in the storage device driver 710.

Figure 8:
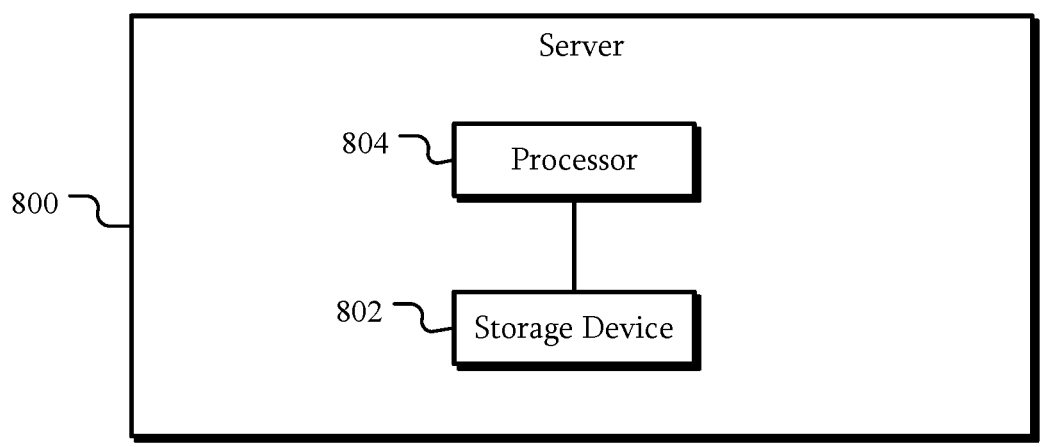
FIG. 8 is a schematic view of a server according to an embodiment.

FIG. 8 is a schematic view of a server according to an embodiment. In this embodiment, the server 800 may include a stand-alone server, a rack-mounted server, a blade server, or the like. The server 800 includes a storage device 802 and a processor 804. The processor 804 is coupled to the storage device 802. Although only one storage device 802 is illustrated, any number of storage devices 802 may be present. The storage device 802 may be any of the above described storage devices. Accordingly, a performance of the server 800 may be improved.

Figure 9:
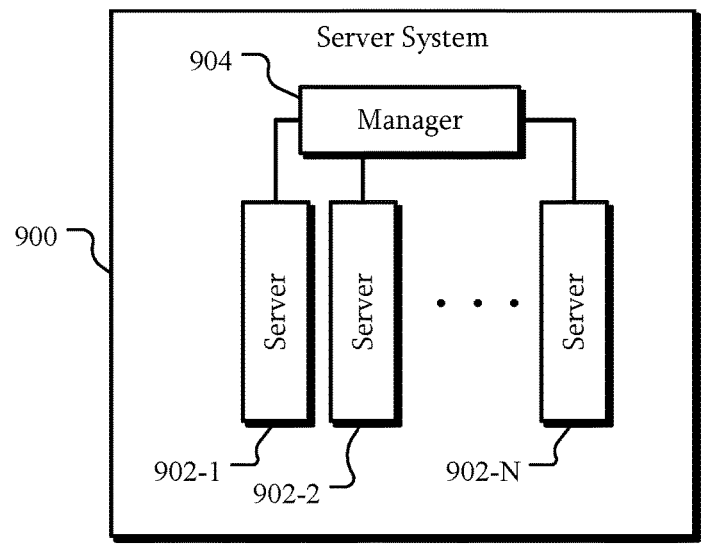
FIG. 9 is a schematic view of a server system according to an embodiment.

FIG. 9 is a schematic view of a server system according to an embodiment. In this embodiment, the server system 900 includes multiple servers 902-1 to 902-N. The servers 902 are each coupled to a manager 904. One or more of the servers 902 may be similar to the server 800 described above.

The manager 904 is configured to manage the servers 902 and other components of the server system 900. In an embodiment, the manager 904 may be configured to monitor the performance of the servers 902. For example, as each of the servers 902 may include a storage device as described above.

Figure 10:
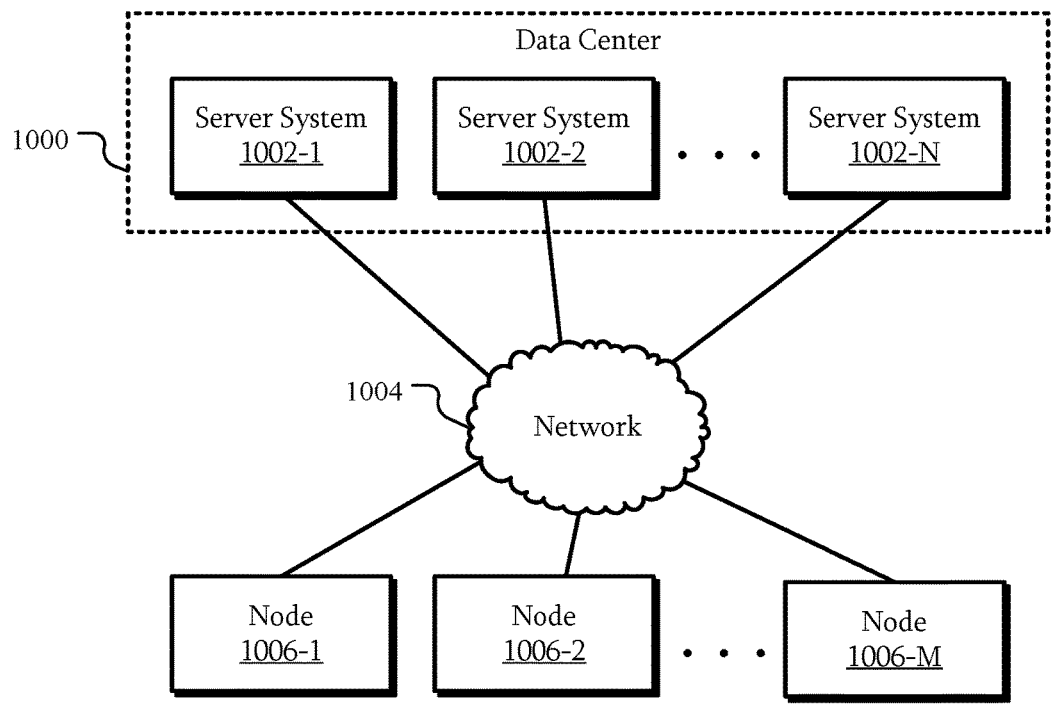
FIG. 10 is a schematic view of a data center according to an embodiment.

FIG. 10 is a schematic view of a data center according to an embodiment. In this embodiment, the data center 1000 includes multiple servers systems 1002-1 to 1002-N. The server systems 1002 may be similar to the server system 900 described above in FIG. 9. The server systems 1002 are coupled to a network 1004, such as the Internet. Accordingly, the server systems 1002 may communicate through the network 1004 with various nodes 1006-1 to 1006-M. For example, the nodes 1006 may be client computers, other servers, remote data centers, storage systems, or the like.

Embodiments may be used where consistent performance is an important factor, such as in cloud and large-scale latency-critical services. Examples of such services include data analytics, machine learning, audio and video streaming; however, in other embodiments, the type of service is different. Consistent latency may be a high priority, and some embodiments use distributed software stacks adopting relaxed consistency requirements in support of more predictable performance. Although several factors lead to inconsistencies in loaded latency, such as resource sharing and queuing, garbage collection in SSDs may account for a significant share.

Current software stacks may use replication, but this solution does not address a root of the problem, such as garbage collection within SSDs, and as a result, may provide limited gains. In addition, replication is inherently more costly, leads to increased network traffic, which may further impact network latency, and also uses coordination at the software layer.

With large rates of data generation, faster data analysis may be used. An important design goal in online services such as search engines and social media is to provide predictable performance. In such a context, average response time may not be representative of performance; worst case performance may be more of a concern. Variability of response time may cause a higher tail latency in components of a service. As a result, users might experience long response time. Depending upon the workload, and SSD firmware policies, tail latency spikes could happen infrequently or frequently, but in most cases may be enough to jeopardize the user experience, and reputation of a service provider in the current highly competitive market.

Tail latency penalties are further exacerbated on shared infrastructures, such as Amazon AWS and Google Cloud. This concern is shared by several cloud vendors, and is recognized as one of the primary challenges while designing both hardware/software system architectures. Although several factors lead to inconsistencies in loaded latency such as resource sharing and queuing, garbage collection in SSDs accounts for a significant share. Due to characteristics of flash memory, which do not allow in-place updates, SSD firmware writes updates out of place, and invalidates the previous copy. In order to reclaim space, invalid space needs to be erased before it can be re-written. However, erase operations are significantly slower (in milliseconds), compared to read or write operations (in microseconds), and is typically done on a coarser granularity. This process constitutes garbage collection in SSDs, and channel cannot service a read/write requests while garbage collection is active. Hence, garbage collection can severely impact the latency (and performance) for critical operations. In some cases the read latency could increase by a factor of 100 during the garbage collection. In addition, the garbage collector runs more frequently as an SSD ages.

Several application types prominent in the cloud are write update heavy. One such example emulating real-world use case is the Yahoo Cloud Serving Benchmark (YCSB), which is a benchmarking suite for evaluating Cloud systems. In some of the update-heavy workloads that are provided in YCSB, access ratio may be 50% reads, 0% inserts, and 50% updates. E-commerce applications are examples of such applications, including operations such as store recording recent actions in a user session, typical actions of an e-commerce user. In this category of applications, the effect of tail latency due to garbage collection in SSDs can create higher latency in user response time. In another workload example, access ratios are 95% reads, 0% inserts, and 5% updates. An example is social media and even small rate of updates can trigger GC and violate the service level goals. For example, with photo tagging, adding a tag is an update, but most operations are to read tags.

Most big data and cloud applications prioritize scalability and consistent performance over more traditional aspects, such as transactional (atomicity, consistency, isolation, durability, or ACID) properties. Strong consistency does not scale well, and most cloud applications favor more relaxed transactional consistencies with the goal of consistent performance. Hence weak consistency models are used extensively across most popular cloud-scale distributed software stacks. This provides significant improvements in I/O performance in heavily loaded, highly concurrent systems.

While all cloud applications store large amounts of data, and are designed to scale with increasing data footprint, only a subset is accessed more frequently than others. This uneven distribution is representative of "hot" (or #trending) data access patterns in data-centers.

Embodiments described herein may be used in a variety of applications and provide a benefit of reduced and/or more consistent latency. The cloud applications described above are merely examples, of such applications.

Although the structures, devices, methods, and systems have been described in accordance with particular embodiments, one of ordinary skill in the art will readily recognize that many variations to the disclosed embodiments are possible, and any variations should therefore be considered to be within the spirit and scope of the structures, devices, and systems disclosed herein. Accordingly, many modifications may be made by one of ordinary skill in the art without departing from the spirit and scope of the appended claims.

The invention claimed is:
1. A storage device, comprising:
a memory; and
a controller including a memory interface coupled to the memory, the controller configured to:
receive write data to write to an address associated with first data stored in the memory and a first differentially compressed value stored in the memory, the first differentially compressed value being determined based on a hash function and a compression function on the first data;
calculate a second differentially compressed value based on the write data and the first data, the second differentially compressed valued being determined based on a hash function and a compression function on the write data and the first data;
store the second differentially compressed value in the memory; and
change the association of the address to reference the second differentially compressed value instead of the first differentially compressed value.

2. The storage device of claim 1, wherein the controller is further configured to:
receive a read request associated with the address;
read the first data;
read the second differentially compressed value;
combine the first data and the second differentially compressed value to form second data; and
respond to the read request with the second data.

3. The storage device of claim 1, wherein the controller is further configured to:
receive a read request associated with the address;
read the first data; and
respond to the read request with the first data.

4. The storage device of claim 1, wherein the controller is further configured to:
maintain an association of the address and the first differentially compressed value;
receive a read request associated with the address;
read the first data;
read the first differentially compressed value;
combine the first data and the first differentially compressed value to form third data; and
respond to the read request with the third data.

5. The storage device of claim 1, wherein:
the address is referred to as a logical address; and
the controller is further configured to:
read the first data;
read the second differentially compressed value;
combine the first data and the second differentially compressed value to form second data;
store the second data in a physical address in the memory; and
update the association of the logical address to reference the physical address storing the second data.

6. The storage device of claim 1, wherein the controller is further configured to maintain a mapping table in the memory including a plurality of entries, each entry including a logical address, a physical address, and an indication of a differentially compressed value.

7. The storage device of claim 1, wherein:
the memory comprises nonvolatile memory and volatile memory; and
the controller is further configured to store the first data in the nonvolatile memory and store the second differentially compressed value in the volatile memory.

8. The storage device of claim 7, wherein the controller is further configured to transfer the second differentially compressed value from the volatile memory to the nonvolatile memory.

9. The storage device of claim 1, wherein the first data is stored in at least part of the memory that cannot perform in-place writes.

10. The storage device of claim 1, wherein the controller is further configured to:
receive a write request with a new address unassociated with data stored in the memory; write data of the write request to the memory; and
create an association of the data written to the memory and the new address.

11. A method, comprising:
receiving write data to write to an address associated with first data stored in a memory and a first differentially compressed value stored in the memory, the first differentially compressed value being determined based on a hash function and a compression function on the first data;
calculating a second differentially compressed value based on the write data and the first data, the second differentially compressed valued being determined based on a hash function and a compression function on the write data and the first data;
storing the second differentially compressed value in the memory; and
changing the association of the address to reference the second differentially compressed value instead of the first differentially compressed value.

12. The method of claim 11, further comprising:
receiving a read request associated with the address;
reading the first data;
reading the second differentially compressed value;
combining the first data and the second differentially compressed value to form second data; and
responding to the read request with the second data.

13. The method of claim 11, further comprising:
receiving a read request associated with the address;
reading the first data; and
responding to the read request with the first data.

14. The method of claim 11, wherein:
the address is referred to as a logical address; and
the method further comprises:
reading the first data;
reading the second differentially compressed value;
combining the first data and the second differentially compressed value to form second data;
storing the second data in a physical address in the memory; and
updating the association of the logical address to reference the physical address.

15. The method of claim 11, further comprising maintaining a mapping table in the memory including a plurality of entries, each entry including a logical address, a physical address, and an indication of a differentially compressed value.

16. The method of claim 11, further comprising:
storing the first data in nonvolatile memory; and
storing the second differentially compressed value in volatile memory.

17. The method of claim 16, further comprising transferring the second differentially compressed value from the volatile memory to the nonvolatile memory.

18. A system, comprising:
a communication interface; and
a processor coupled to a memory through the communication interface, the processor configured to:
receive write data to write to an address associated with first data stored in a storage device coupled to the processor and a first differentially compressed value, the first differentially compressed value being determined based on a hash function and a compression function on the first data;

calculate a second differentially compressed value based on the write data and the first data, the second differentially compressed valued being determined based on a hash function and a compression function on the write data and the first data; and change the association of the address to reference the second differentially compressed value instead of the first differentially compressed value.

19. The system of claim 18, further comprising:

a memory coupled to the processor;

wherein the processor is further configured to store the second differentially compressed value in the memory.

20. The system of claim 18, wherein the processor is further configured to store the second differentially compressed value in the storage device.

* * * * *